(12) United States Patent
Enriquez

(10) Patent No.: US 9,487,257 B1
(45) Date of Patent: Nov. 8, 2016

(54) BICYCLE SEAT SUPPORT AND STORAGE SYSTEM

(71) Applicant: Jesus R. Enriquez, Tucson, AZ (US)

(72) Inventor: Jesus R. Enriquez, Tucson, AZ (US)

(*) Notice: Subject to any disclaimer, the term of this patent is extended or adjusted under 35 U.S.C. 154(b) by 0 days.

(21) Appl. No.: 14/846,448

(22) Filed: Sep. 4, 2015

Related U.S. Application Data

(60) Provisional application No. 62/046,511, filed on Sep. 5, 2014.

(51) Int. Cl.
| | |
|---|---|
| *B62J 11/02* | (2006.01) |
| *B62J 1/08* | (2006.01) |
| *B62J 11/00* | (2006.01) |
| *B60C 23/10* | (2006.01) |
| *B62J 9/00* | (2006.01) |
| *B62J 1/10* | (2006.01) |

(52) U.S. Cl.
CPC ............. *B62J 1/08* (2013.01); *B60C 23/105* (2013.01); *B62J 9/006* (2013.01); *B62J 11/00* (2013.01); *B62J 1/10* (2013.01); *B62J 11/02* (2013.01); *B62J 2001/085* (2013.01)

(58) Field of Classification Search
CPC .............. B62J 11/02; B62J 1/08; B62J 1/10; B62J 2001/085; B62J 9/006; B62J 11/00; B60C 23/105

See application file for complete search history.

(56) References Cited

U.S. PATENT DOCUMENTS

| | | | |
|---|---|---|---|
| 2009/0096184 A1* | 4/2009 | Krudenscheidt | B60C 23/105 280/201 |
| 2011/0148067 A1* | 6/2011 | Haager | B60C 23/105 280/201 |

* cited by examiner

*Primary Examiner* — Anne Marie Boehler
*Assistant Examiner* — Marlon A Arce

(57) ABSTRACT

A bicycle seat support and inflation storage system. A bicycle seat is mounted to a first end of a bicycle seat post. A first end of a post adapter is threaded to a second end of the seat post. A first end of an inflation adapter is threaded to the second end of the post adapter. A pressurized gas cartridge is disposed inside a chamber of the seat post. The system is partially disposed inside a bicycle seat tube during storage. The seat post is removed from the bicycle seat tube and the post adapter is detached from the seat post to release the cartridge. The inflation adapter is detached from the post adapter and attached to a tire tube valve stem. The cartridge is attached to the inflation adapter first end and a rupture seal is broken to release the pressurized gas for inflating the tire tube.

16 Claims, 4 Drawing Sheets

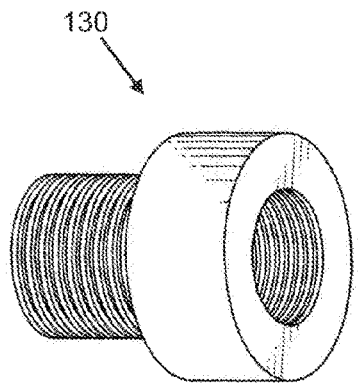
FIG. 4
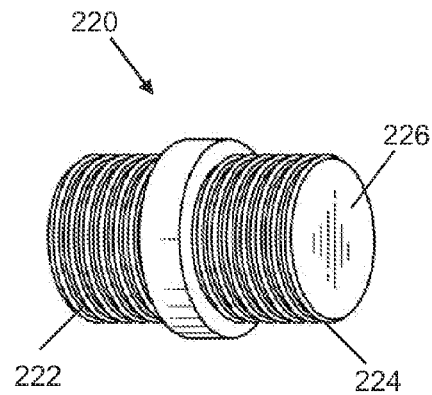
FIG. 5
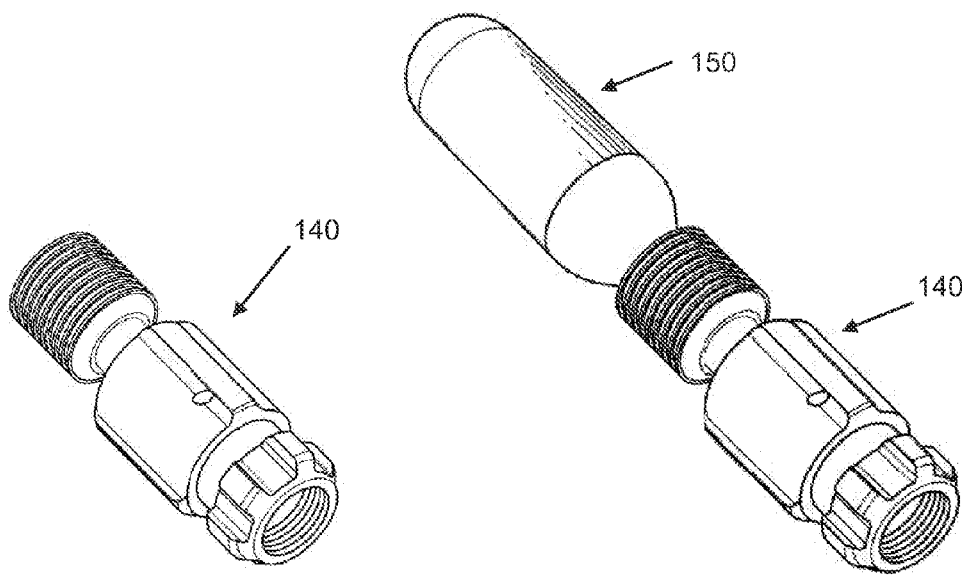
FIG. 6
FIG. 7

BICYCLE SEAT SUPPORT AND STORAGE SYSTEM

CROSS REFERENCE

This application claims priority to U.S. Provisional Patent Application No. 62/046,511, filed Sep. 5, 2014, the specification(s) of which is/are incorporated herein in their entirety by reference.

FIELD OF THE INVENTION

The present invention relates to a bicycle seat post having a tire inflator storage system.

BACKGROUND OF THE INVENTION

Cycling is a popular form of transport, exercise, recreation, and sport. One problem of riding a bicycle is the common occurrence of a flat bicycle tire. Repair of the flat bike tire is inconvenient, especially when the flat bike tire occurs during a ride. A bicycle rider typically carries a tire repair kit having a tire pump, tire tools, and a tire patch. The tire repair kit may be carried by the rider or attached to the bike frame, which adds bulk and weight to the bicycle. Moreover, the use of the tire pump to inflate a bike tire is both time consuming and exhausting. One would need to exert a lot of energy to pump the tire to the proper tire pressure, which may be as high as 130 psi for road bike tires. Since the tire pump is usually mounted to the bicycle frame, the tire pump could be stolen or accidentally detached and lost during a ride.

One alternative to the tire pump is to use a high-pressure gas cartridge, such as a $CO_2$ cartridge, to inflate the flat tire. These gas cartridges are small and convenient to carry during a ride, and significantly reduce inflation time and effort. However, these gas cartridges would still need to be carried in the bulky tire repair kit. Hence, there is need for a bicycle tire repair system that is convenient for transport and can efficiently inflate a flat bike tire.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The subject disclosure of a bicycle seat support and storage system is described herein. In one embodiment, the system may comprise a cylindrical, hollow seat post, a post adapter, an inflation adapter, and at least one pressurized cartridge. The seat post may have a post first end having a seat bracket disposed thereon and an internally threaded post second end. A post opening may be disposed on the post second end and fluidly connected to a post chamber disposed inside the post.

In another embodiment, the post adapter may have an externally threaded post adapter first end and an internally threaded post adapter second end. The post adapter first end may be adapted to matingly thread with the post second end. In other embodiments, the inflation adapter may have an internally and externally threaded inflation adapter first end and an internally threaded inflation adapter second end. Preferably, the inflation adapter first end is adapted to matingly thread with the post adapter second end, and the inflation adapter second end is adapted to matingly thread with a tire tube valve stem. In some embodiments, the cartridge may have an externally threaded cartridge outlet disposed on a cartridge end. A rupture seal may be disposed on the cartridge outlet for sealing pressurized gas in the cartridge. Preferably, the cartridge is adapted to fit through the post opening and stored inside the post chamber.

When storing of the system, the cartridge may be disposed inside the post chamber, the post adapter may be rotatingly attached to the post second end, and the inflation adapter may be rotatingly attached to the post adapter. Preferably, the seat post may partially disposed inside a bicycle seat tube of a bicycle frame such that at least the post adapter, the inflation adapter, and the cartridge are also disposed inside the bicycle seat tube, and the post first end projects outwardly from the bicycle seat tube.

When using the system to inflate a tire tube, the seat post may be slidably detached from the bicycle seat tube, the post adapter may be rotatingly detached from the seat post, and the cartridge may be slidably removed from the post chamber via the post opening. The inflation adapter may be rotatingly detached from the post adapter and the inflation adapter second end is matingly threaded with the tire tube valve stem. The cartridge may be matingly threaded with the inflation adapter first end and the rupture seal is broken to release the pressurized gas for inflating the tire tube.

BRIEF DESCRIPTION OF THE DRAWINGS

FIG. 4 depicts a seat post adapter of the present invention.

FIG. 5 depicts a coupling component of the present invention.

FIG. 6 depicts an inflation adapter of the present invention.

FIG. 7 depicts a gas cartridge connected to the inflation adapter.

DESCRIPTION OF PREFERRED EMBODIMENTS

Figure 1:
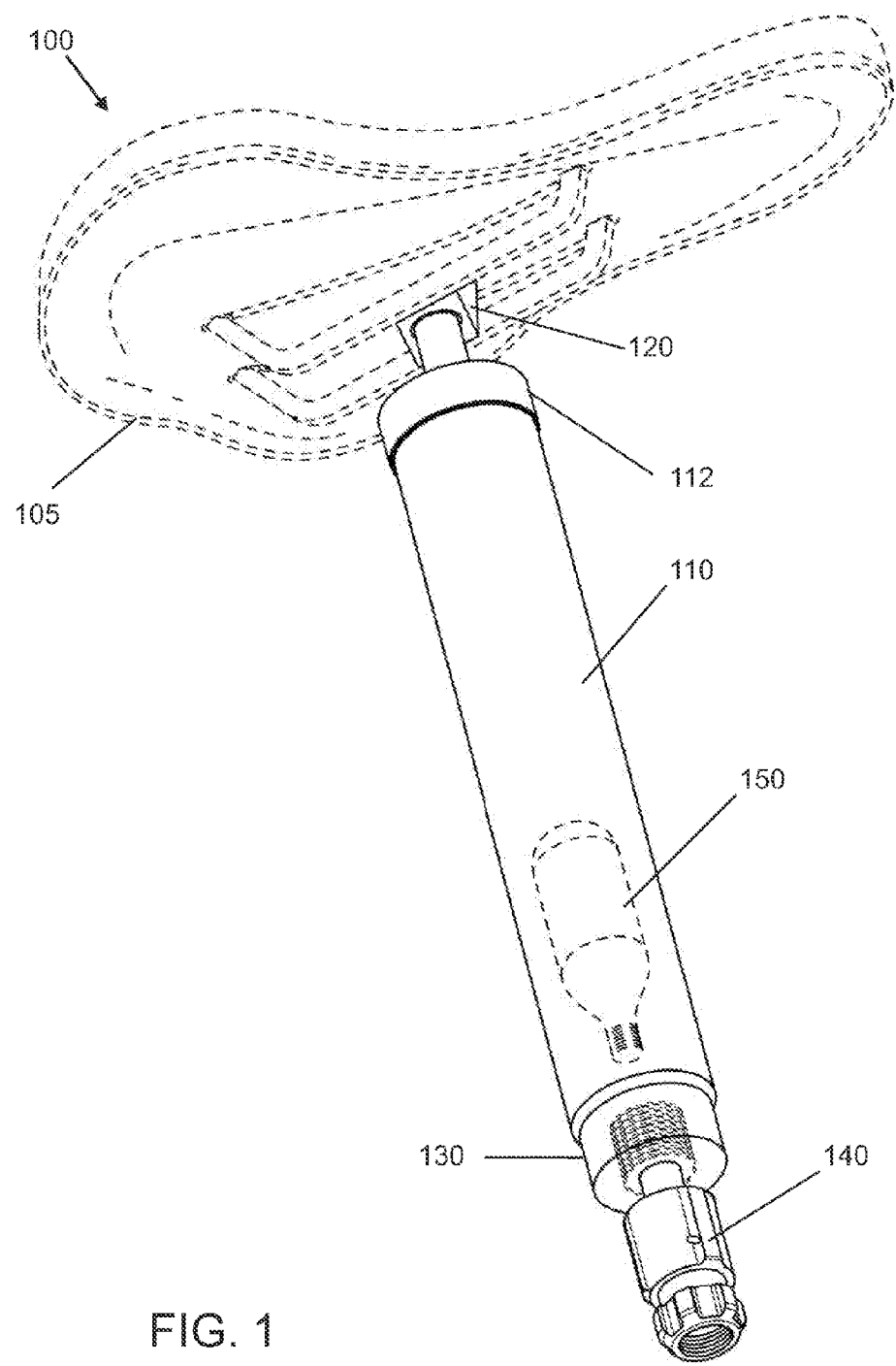
FIG. 1 shows a perspective of an embodiment of the present invention.
Figures 2, 3:
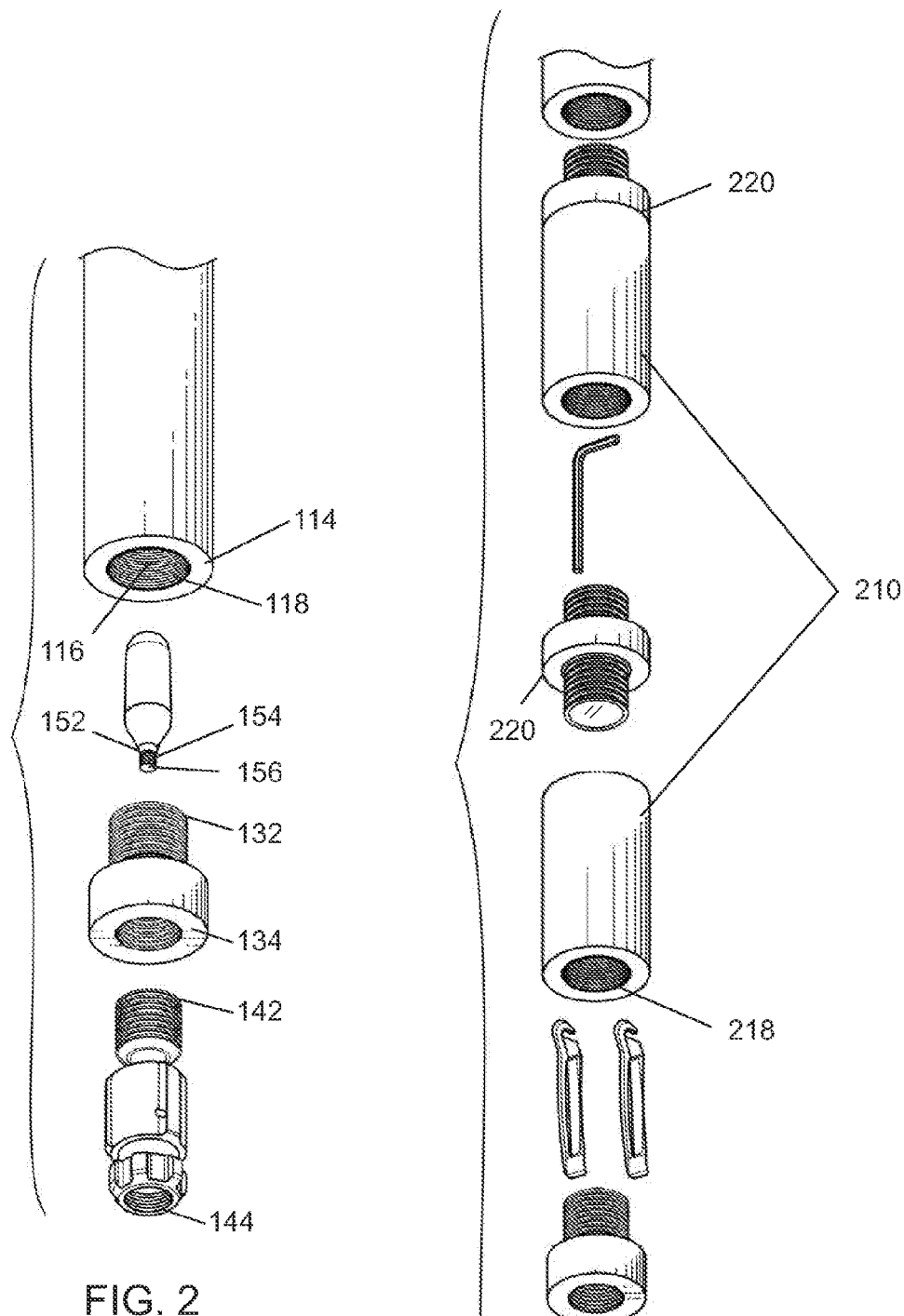
FIG. 2 shows an exploded view of an embodiment of the present invention.
FIG. 3 shows an exploded view of an alternative embodiment of the present invention.
Figure 8:
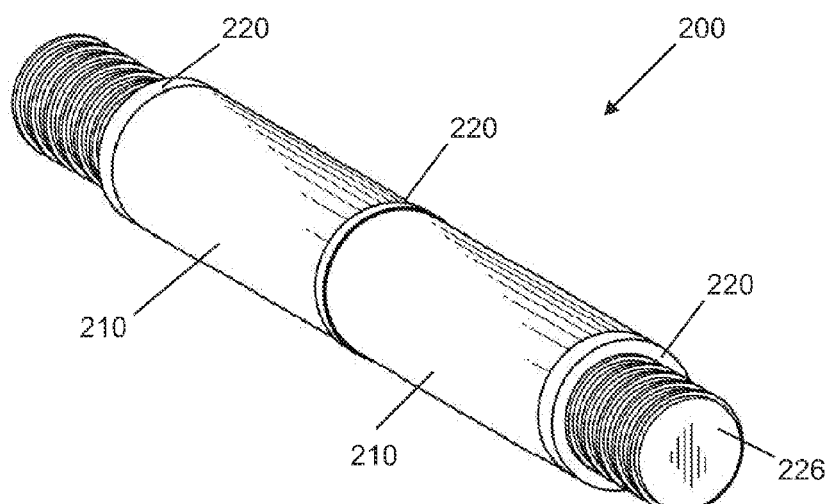
FIG. 8 shows an embodiment of a seat post extension assembled with the coupling component.
Figure 9:
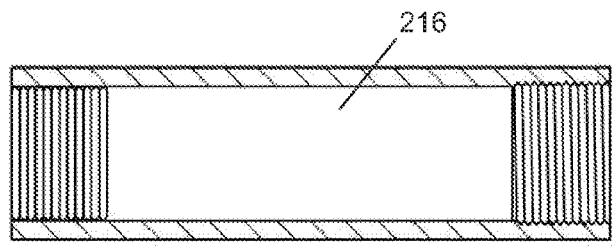
FIG. 9 shows a cross-sectional view of the seat post extension.
Figure 10:
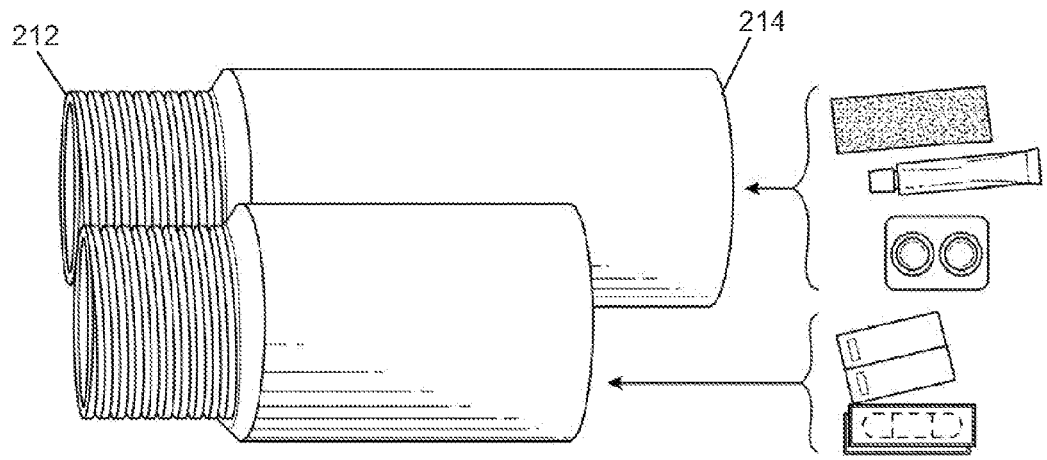
FIG. 10 shows alternative embodiments of the seat post extension.

Following is a list of elements corresponding to a particular element referred to herein:

100 bicycle seat support and inflation storage system
110 seat post
112 post first end
114 post second end
116 post chamber
118 post opening
120 seat bracket
130 post adapter
132 post adapter first end
134 post adapter second end
140 inflation adapter 142 inflation adapter first end
144 inflation adapter second end
150 pressurized cartridge
152 cartridge end
154 cartridge outlet
156 rupture seal
200 extension storage system
210 seat post extensions
212 extension first end
214 extension second end
216 extension chamber
218 extension opening
220 coupling
222 coupling first end
224 coupling second end
226 coupling solid surface Referring now to FIGS. 1-10, an embodiment of the present invention features a bicycle seat support and storage system (100) comprising a cylindrical, hollow seat post (110), a bicycle seat (105) mounted to the seat post (110), a post adapter (130), an inflation adapter (140), and at least one pressurized cartridge (150).

In some embodiments, the seat post (110) may be a tubular post having a seat bracket (120) disposed on a post first end (112) and an internally threaded post second end (114). A post opening (118) may be disposed on the post second end (114) and fluidly connected to a post chamber (116) disposed inside the seat post (110). The seat post (110) may range in length from about 5 inches to 12 inches. It may be constructed from metal or a carbon fiber. The bicycle seat (105) may be mounted to the seat post (110) via the seat bracket (120). The seat bracket (120) may be a clamp-like bracket that can be removeably fastened to the seat rails of the bicycle seat (105).

In one embodiment, the post adapter (130) may have an externally threaded post adapter first end (132) and an internally threaded post adapter second end (134). The externally threaded post adapter first end (132) may be adapted to matingly thread with the internally threaded post second end (114). In another embodiment, the post adapter first end (132) may be internally threaded such that the post adapter first end (132) is adapted to matingly thread with the cartridge (150) during storage of the system (100) in order to prevent movement of the cartridge (150) within the post chamber (116).

In some embodiments, the inflation adapter (140) may have an internally and externally threaded inflation adapter first end (142) and an internally threaded spring-biased inflation adapter second end (144). Preferably, the external threading of the inflation adapter first end (142) may be adapted to matingly thread with the internally threaded post adapter second end (134), and the internally threaded inflation adapter second end (144) may be adapted to matingly thread with an externally threaded tire tube valve stem of a bicycle tire. Alternatively, the inflation adapter (140) may comprise an inflation valve disposed at or near the inflation adapter second end (144). For example, when the tire tube valve stem is mated with the inflation valve, the inflation valve is actuated to release gas from the cartridge and into the tire tube valve stem. The spring-biased inflation adapter second end may provide for adjustability in the amount of gas released from the cartridge (150).

In a preferred embodiment, the pressurized cartridge (150) may have an externally threaded cartridge outlet (154) disposed on a cartridge end (152). The externally threaded cartridge outlet (154) is adapted to matingly thread with the internal threading of the inflation adapter first end (142). A rupture seal (156) may be disposed on the cartridge outlet (154) for sealing pressurized gas in the cartridge (150). In some embodiments, the pressurized gas comprises $CO_2$, air, or any other inert gas. Preferably, the cartridge (150) is adapted to slidably fit through the post opening (118) and be stored inside the post chamber (116). For example, the cartridge (150) may be cylindrical in shape and constructed from a durable material, such as metal, capable of holding the high-pressure gas contents. The cartridge may be about 3 to 5 inches in length and may have a diameter relatively smaller than an inner diameter of the seat post (110). In alternate embodiments, for example, two or three cartridges may be disposed inside the seat post.

Another embodiment of the present invention features a bicycle seat support and storage system (100) comprising a cylindrical, hollow seat post, a post adapter (130), an inflation adapter (140), and at least one pressurized cartridge (150). In some embodiments, the seat post (110) may have a seat bracket (120) disposed on a post first end (112) and an internally threaded post second end (114). A post opening (118) may be disposed on the post second end (114) and fluidly connected to a post chamber (116) disposed inside the post (110). Preferably, a bicycle seat (105) can be mounted to the seat post (110) via the seat bracket (120).

In one embodiment, the post adapter (130) may have an externally threaded post adapter first end (132) and an internally threaded post adapter second end (134). The externally threaded post adapter first end (132) may be adapted to matingly thread with the internally threaded post second end (114). In another embodiment, the post adapter first end (132) may be internally threaded such that the internal threading of the post adapter first end (132) is adapted to matingly thread with the cartridge (150) during storage of the system (100).

In other embodiments, the inflation adapter (140) may have an internally and externally threaded inflation adapter first end (142) and an internally threaded inflation adapter second end (144). Preferably, the external threading of the inflation adapter first end (142) is adapted to matingly thread with the internally threaded post adapter second end (134), and the inflation adapter second end (144) is adapted to matingly thread with a tire tube valve stem. Alternatively, the inflation adapter (140) may comprise an inflation valve disposed at or near the inflation adapter second end (144). For example, when the tire tube valve stem is mated with the inflation valve, the inflation valve is actuated to release gas from the cartridge and into the tire tube valve stem. In further embodiments, the inflation adapter can control and adjust the amount of gas released from the cartridge (150).

In some embodiments, the cartridge (150) may have an externally threaded cartridge outlet (154) disposed on a cartridge end (152). A rupture seal (156) may be disposed on the cartridge outlet (154) for sealing pressurized gas in the cartridge (150). Non-limiting examples of the pressurized gas includes $CO_2$, air, or any other inert gas. Preferably, the cartridge (150) is adapted to fit through the post opening (118) and be stored inside the post chamber (116). For example, the cartridge (150) may be cylindrical in shape and constructed from a durable material, such as metal, capable of holding the high-pressure gas contents. The cartridge may be about 3 to 5 inches in length and may have a diameter relatively smaller than an inner diameter of the seat post (110). In alternate embodiments, for example, two or three cartridges may be disposed inside the seat post.

As an exemplary illustration for storage of any embodiment of the system (100), the cartridge (150) may be disposed inside the post chamber (116), the post adapter (130) may be rotatingly attached to the post second end (114), and the inflation adapter (140) may be rotatingly attached to the post adapter (130). Preferably, the seat post (110) may partially disposed (i.e. telescopingly) inside a bicycle seat tube of a bicycle frame such that at least the post adapter (130), the inflation adapter (140), and the cartridge (150) are also disposed inside the bicycle seat tube, and the post first end (112) projects outwardly from the bicycle seat tube.

As an exemplary illustration for use of any embodiment of the system (100) to inflate a tire tube, the seat post (110) may be slidably detached from the bicycle seat tube, the post adapter (130) may be rotatingly detached from the seat post (110), and the cartridge (150) may be slidably removed from the post chamber (116) via the post opening (118). The inflation adapter (140) may be rotatingly detached from the post adapter (130) and the inflation adapter second end (144) is then matingly threaded with the tire tube valve stem. The cartridge (150) may then be matingly threaded with the inflation adapter first end (142) and the rupture seal (156) is broken to release the pressurized gas for inflating the tire tube. In one embodiment, the inflation adapter (140) may have a puncturing means, such as a hollow needle point, that can break the rupture seal (156).

In an alternate embodiment, the system (100) may further comprise one or more seat post extensions (210). Each post extension (210) may comprise an externally threaded extension first end (212), an internally threaded extension second end (214), an extension chamber (216). In one embodiment, the extension first end (212) may be adapted to matingly thread with the post second end (114) or with the extension second end (214) of another post extension (210). In another embodiment, the extension second end (214) may be adapted to matingly thread with the post adapter first end (132) or with the extension first end (212) of another post extension (210). In some embodiments, the post extensions (210) may be cylindrical, hollow tubes having a length of about 3 to 5 inches. Each post extension may have an extension opening (218) fluidly connected to the extension chamber (216). Preferably, the post extensions have an outer diameter smaller than or equal to an outer diameter of the seat post.

In some embodiments, a tire patching kit may be disposed inside the extension chamber (216). The tire patching kit may comprise an abrasive, such as sand paper, at least one tire patch, and a patch adhesive, such as rubber cement. In other embodiments, a tool kit may be disposed inside the extension chamber (216). The tool kit may comprise at least one tire lever and at least one hex key. The tool kit may also include a screwdriver tool, such as a philips or flat-blade bit, a wrench, and a cutting tool. In further embodiments, a first-aid kit may be disposed inside the extension chamber (216). The first-aid kit may comprise at least one antiseptic wipe, an antibiotic ointment, and at least one bandage. The first-aid kit may further comprise a wound dressing, medical tape, and cleansing wipes.

For example, one post extension (210) may be attached to the seat post (110) by threading the externally threaded extension first end (212) to the internally threaded post second end (114). The tire patching kit, the tool kit, the first-aid kit, or a pressurized cartridge may be slidably disposed inside the extension chamber (216) via the extension opening (218), and the post adapter (130) may be attached to the post extension (210) by threading the externally threaded post adapter first end (132) to the internally threaded extension second end (214).

As another example, a first post extension (210) may be attached to the seat post (110) by threading the externally threaded extension first end (212) to the internally threaded post second end (114). A second post extension (210) may be attached to the first post extension (210) by threading the second end (214) of the first post extension (210) to the first end (212) of the second post extension (210). The tire patching kit, the tool kit, the first-aid kit, or a pressurized cartridge may be slidably disposed inside each extension chamber (216) via the extension opening (218), and the post adapter (130) may be attached to the second post extension (210) by threading the post adapter first end (132) to the second end (214) of the second post extension (210).

Another embodiment of the system (100) further comprises an extension storage system (200). In one embodiment, the extension storage system may comprise one or more seat post extensions (210) and one or more couplings (220). Preferably, the number of couplings (220) is equal to the number of extensions (210). In one embodiment, each post extension (210) may comprise an internally threaded extension first end (212), an internally threaded extension second end (214), and an extension chamber (216). In another embodiment, each coupling may comprise an externally threaded coupling first end (222) and an externally threaded coupling second end (224). In some embodiments, the extension first end (212) may be adapted to matingly thread with the coupling second end (224). In other embodiments, the coupling first end (222) is adapted to matingly thread with the post second end (114) or the extension second end (214). In further embodiments, the extension second end (214) may be adapted to matingly thread with the coupling first end (222) or the post adapter first end (132).

In some embodiments, a tire patching kit may be disposed inside the extension chamber (216). The tire patching kit may comprise an abrasive, such as sand paper, at least one tire patch, and a patch adhesive, such as rubber cement. In other embodiments, a tool kit may be disposed inside the extension chamber (216). The tool kit may comprise at least one tire lever and at least one hex key. The tool kit may also include a screwdriver tool, such as a philips or flat-blade bit, a wrench, and a cutting tool. In further embodiments, a first-aid kit may be disposed inside the extension chamber (216). The first-aid kit may comprise at least one antiseptic wipe, an antibiotic ointment, and at least one bandage. The first-aid kit may further comprise a wound dressing, medical tape, and cleansing wipes.

In some embodiments, the post extensions (210) may be cylindrical, hollow tubes having a length of about 3 to 5 inches. Each post extension may have an extension opening (218) fluidly connected to the extension chamber (216). Preferably, the post extensions have an outer diameter smaller than or equal to an outer diameter of the seat post. In other embodiments, each coupling (220) may be may have a length of about 0.5 to 2 inches. Each coupling first end (222) and coupling second end (224) may have a solid surface (226) that effectively blocks and prevents the contents in the extension chamber (216) from being displaced during storage. Preferably, the solid surface is be flat, but can also be rounded or tapered.

For example, one coupling (220) may be attached to the seat post (110) by threading the externally threaded coupling first end (222) to the internally threaded post second end (114). One extension may be attached to the coupling by threading the internally threaded extension first end (212) to the externally threaded coupling second end (224). The tire patching kit, the tool kit, the first-aid kit, or a pressurized canister may be slidably disposed inside the extension chamber (216) via the extension opening (218), and the post adapter (130) may be attached to the post extension (210) by threading the externally threaded post adapter first end (132) to the internally threaded extension second end (214).

As another example, a first coupling (220) may be attached to the seat post (110) by threading the externally threaded first end (222) of the first coupling (220) to the internally threaded post second end (114). A first post extension (210) may be attached to the first coupling (220) by threading the externally threaded second end (224) of the first coupling (220) to the internally threaded first end (212) of the first extension (210). A second coupling (220) may be attached to the first extension (220) by threading the internally threaded second end (214) of the first extension (210) to the externally threaded first end (222) of the second coupling (220). A second post extension (210) may be attached to the second coupling (220) by threading the externally threaded second end (224) of the second coupling (220) to the internally threaded first end (212) of the second post extension (210) to the first end (212) of the second post extension (210). The tire patching kit, the tool kit, the first-aid kit, or a pressurized canister may be slidably disposed inside each extension chamber (216) via the extension opening (218), and the post adapter (130) may be attached to the second post extension (210) by threading the post adapter first end (132) to the second end (214) of the second post extension (210).

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A bicycle seat support and storage system (100) comprising:
    a. a cylindrical, hollow seat post (110) having a seat bracket (120) disposed on a post first end (112) and an internally threaded post second end (114), wherein a post opening (118) is disposed on the post second end (114) and fluidly connected to a post chamber (116) disposed inside the post (110);
    b. a bicycle seat (105) mounted to the seat post (110) via the seat bracket (120);
    c. a post adapter (130) having an externally threaded post adapter first end (132) and an internally threaded post adapter second end (134), wherein the post adapter first end (132) is adapted to matingly thread with the post second end (114);
    d. an inflation adapter (140) having an internally and externally threaded inflation adapter first end (142) and an internally threaded spring-biased inflation adapter second end (144), wherein the inflation adapter first end (142) is adapted to matingly thread with the post adapter second end (134), wherein the inflation adapter second end (144) is adapted to matingly thread with a tire tube valve stem; and
    e. at least one pressurized cartridge (150) having an externally threaded cartridge outlet (154) disposed on a cartridge end (152), wherein a rupture seal (156) is disposed on the cartridge outlet (154) for sealing pressurized gas in the cartridge (150), wherein the cartridge (150) is adapted to slidably fit through the post opening (118) and be stored inside the post chamber (116);
    wherein for storage of the system (100), the cartridge (150) is disposed inside the post chamber (116), the post adapter (130) is rotatingly attached to the post second end (114), and the inflation adapter (140) is rotatingly attached to the post adapter (130), wherein the seat post (110) is partially disposed inside a bicycle seat tube of a bicycle frame such that at least the post adapter (130), the inflation adapter (140), and the cartridge (150) are disposed inside the bicycle seat tube,
    wherein for use of the system (100) to inflate a tire tube, the seat post (110) is slidably detached from the bicycle seat tube, the post adapter (130) is rotatingly detached from the seat post (110) and the cartridge (150) is removed from the post chamber (116) via the post opening (118), wherein the inflation adapter (140) is rotatingly detached from the post adapter (130), wherein the inflation adapter second end (144) is matingly threaded with the tire tube valve stem, wherein the cartridge (150) is matingly threaded with the inflation adapter first end (142), and wherein the rupture seal is broken to release the pressurized gas for inflating the tire tube.

2. The system (100) of claim 1, wherein the pressurized gas comprises $CO_2$.

3. The system (100) of claim 1, wherein the post adapter first end (132) is internally threaded such that the post adapter first end (132) is adapted to matingly thread with the cartridge (150) during storage of the system (100).

4. A bicycle seat support and storage system (100) comprising:
    a. a cylindrical, hollow seat post (110) having a seat bracket (120) disposed on a post first end (112) and an internally threaded post second end (114), wherein a post opening (118) is disposed on the post second end (114) and fluidly connected to a post chamber (116) disposed inside the post (110);
    b. a post adapter (130) having an externally threaded post adapter first end (132) and an internally threaded post adapter second end (134), wherein the post adapter first end (132) is adapted to matingly thread with the post second end (114);
    c. an inflation adapter (140) having an internally and externally threaded inflation adapter first end (142) and an internally threaded inflation adapter second end (144), wherein the inflation adapter first end (142) is adapted to matingly thread with the post adapter second end (134), wherein the inflation adapter second end (144) is adapted to matingly thread with a tire tube valve stem; and d. at least one pressurized cartridge (150) having an externally threaded cartridge outlet (154) disposed on a cartridge end (152), wherein a rupture seal (156) is disposed on the cartridge outlet (154) for sealing pressurized gas in the cartridge (150), wherein the cartridge (150) is adapted to fit inside the post chamber (116);

wherein for storage of the system (100), the cartridge (150) is disposed inside the post chamber (116), the post adapter (130) is rotatingly attached to the post second end (114), and the inflation adapter (140) is rotatingly attached to the post adapter (130), wherein the seat post (110) is partially disposed inside a bicycle seat tube of a bicycle frame such that at least the post adapter (130), the inflation adapter (140), and the cartridge (150) are disposed inside the bicycle seat tube, wherein for use of the system (100) to inflate a tire tube, the seat post (110) is slidably detached from the bicycle seat tube, the post adapter (130) is rotatingly detached from the seat post (110) such that the cartridge (150) is removed from the post chamber (116) via the post opening (118), wherein the inflation adapter (140) is rotatingly detached from the post adapter (130), wherein the inflation adapter second end (144) is matingly threaded with the tire tube valve stem, wherein the cartridge (150) is matingly threaded with the inflation adapter first end (142), and wherein the rupture seal is broken to release the pressurized gas for inflating the tire tube.

5. The system (100) of claim 4, wherein the pressurized gas comprises $CO_2$.

6. The system of claim 4, wherein the post adapter first end (132) is internally threaded such that the post adapter first end (132) is adapted to matingly thread with the cartridge (150) during storage of the system (100).

7. The system (100) of claim 4, wherein a bicycle seat (105) is mounted to the seat post (110) via the seat bracket (120).

8. The system (100) of claim 4 further comprising one or more seat post extensions (210), each post extension (210) comprising an externally threaded extension first end (212), an internally threaded extension second end (214), and an extension chamber (216), wherein the extension first end (212) is adapted to matingly thread with the post second end (114) or the extension second end (214) of another post extension (210), wherein the extension second end (214) is adapted to matingly thread with the post adapter first end (132) or the extension first end (212) of another post extension (210).

9. The system of claim 8, wherein a tire patching kit is disposed inside the extension chamber, wherein the tire patching kit comprises an abrasive, at least one tire patch, and a patch adhesive.

10. The system of claim 8, wherein a tool kit is disposed inside the extension chamber, wherein the tool kit comprises at least one tire lever and at least one hex key.

11. The system of claim 8, wherein a first-aid kit is disposed inside the extension chamber, wherein the first-aid kit comprises at least one antiseptic wipe, an antibiotic ointment, and at least one bandage.

12. The system (100) of claim 4 further comprising an extension storage system (200) comprising:

a. one or more seat post extensions (210), each comprising an internally threaded extension first end (212), an internally threaded extension second end (214), and an extension chamber (216); and b. one or more couplings (220), each coupling comprising an externally threaded coupling first end (222) and an externally threaded coupling second end (224);

wherein the extension first end (212) is adapted to matingly thread with the coupling second end (224), wherein the coupling first end (222) is adapted to matingly thread with the post second end (114) or the extension second end (214), wherein the extension second end (214) is adapted to matingly thread with the coupling first end (222) or the post adapter first end (132).

13. The system (100) of claim 12, wherein each coupling first end (222) and coupling second end (224) comprises a solid surface (226) that prevents the cartridge (150) from being displaced from the extension chamber (216).

14. The system of claim 12, wherein a tire patching kit is disposed inside the extension chamber, wherein the tire patching kit comprises an abrasive, at least one tire patch, and a patch adhesive.

15. The system of claim 12, wherein a tool kit is disposed inside the extension chamber, wherein the tool kit comprises at least one tire lever and at least one hex key.

16. The system of claim 12, wherein a first-aid kit is disposed inside the extension chamber, wherein the first-aid kit comprises at least one antiseptic wipe, an antibiotic ointment, and at least one bandage.

* * * * *